US008463574B2

(12) United States Patent
Schaafsma et al.

(10) Patent No.: US 8,463,574 B2

(45) Date of Patent: Jun. 11, 2013

(54) METHOD TO ORIENT A SPHERE OR BALL

(75) Inventors: Christopher T. Schaafsma, Wheaton, IL (US); Robert F. Hitchcock, West Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 12/393,497

(22) Filed: Feb. 26, 2009

(65) Prior Publication Data

US 2009/0281763 A1 Nov. 12, 2009

Related U.S. Application Data

(60) Provisional application No. 61/050,680, filed on May 6, 2008.

(51) Int. Cl.
*G01C 19/00* (2006.01)

(52) U.S. Cl.
USPC ................ 702/150; 702/33; 702/81; 702/157

(58) Field of Classification Search
USPC .............................. 702/150; 378/20; 382/287
See application file for complete search history.

(56) References Cited

U.S. PATENT DOCUMENTS

| | | | | |
|---|---|---|---|---|
| 4,578,806 | A | 3/1986 | Grass et al. | |
| 4,742,620 | A | 5/1988 | Manker | |
| 5,149,089 | A | 9/1992 | Zelinski | |
| 5,711,719 | A | 1/1998 | Fireman | |
| 6,209,605 | B1 | 4/2001 | Lee et al. | |
| 2003/0114250 | A1 * | 6/2003 | Nesbitt | 473/371 |
| 2004/0042586 | A1 * | 3/2004 | Furze | 378/163 |
| 2005/0070375 | A1 | 3/2005 | Savarese | |
| 2009/0059204 | A1 * | 3/2009 | Harris et al. | 356/51 |

FOREIGN PATENT DOCUMENTS

| | | |
|---|---|---|
| CN | 1871525 A | 11/2006 |
| WO | 9640527 | 12/1996 |
| WO | 2005070506 A1 | 8/2005 |

OTHER PUBLICATIONS

International Search Report for PCT/US2009-037606 dated Jun. 29, 2009.

* cited by examiner

*Primary Examiner* — Elias Desta
(74) *Attorney, Agent, or Firm* — Levenfeld Pearlstein, LLC

(57) ABSTRACT

A method for aligning a sphere to a desired orientation includes imaging a non-surface alignment feature of the sphere and calculating a current orientation of the sphere based on an image of the non-surface alignment feature. Using these calculations, a relationship between the current orientation of the sphere and the desired orientation of the sphere is calculated and communicated to a motion control device, and aligning the sphere into the desired orientation using the motion control device.

5 Claims, 2 Drawing Sheets

METHOD TO ORIENT A SPHERE OR BALL

BACKGROUND OF THE INVENTION

The present invention is directed to orient spheres. More particularly, the present invention pertains to a method to orient and align spheres into a desired position during manufacturing or printing.

By their nature, game balls, and other spheres are difficult to align to a specific orientation, even when there are identifiable features or images on their surface. This task is made even more difficult when carried out at a rate that is high enough to support common manufacturing method rates. Often the external features which are used as guides are not easily or quickly discernable. In addition, once the exterior feature is found, the sphere must then be aligned into the desired orientation.

Golf ball production is one example in which spheres may be oriented for a particular purpose. Many golf ball decorations are applied in a specific location on the ball which is relative to the parting line from the molding process in which the balls are manufactured. While the pattern on each golf ball contains identifiable and/or unique features that can be used to orient the ball (including dimple pattern differences, dimple shape differences, the seam itself), current practice has shown that it is difficult to use these visible features to orient the ball quickly and effectively at desired production rates. As production rates increase, the problem of proper orientation of the sphere becomes even more apparent as designs or images intended to be placed in a specific position on the balls are placed askew.

Accordingly, there is a need for a method of orienting a sphere or ball without using visible external features on the surface of the ball or sphere. Such a method desirably allows the sphere to remain in place while the identifying feature is ascertained. The position of the identifying feature is then calculated and the sphere oriented into a desired position.

BRIEF SUMMARY OF THE INVENTION

A method of accurately aligning a sphere or ball to a specific orientation during or after manufacturing includes identifying an internal feature, either deliberately inserted or created as an artifact during the manufacturing process, to determine the current position and/or orientation of the sphere. The sphere is then rotated and oriented into a desired position. The internal feature may be a filament inserted into the ball after or during manufacturing and may be drilled into the sphere or placed within the sphere at a location congruent with the parting line from a sphere molding process.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
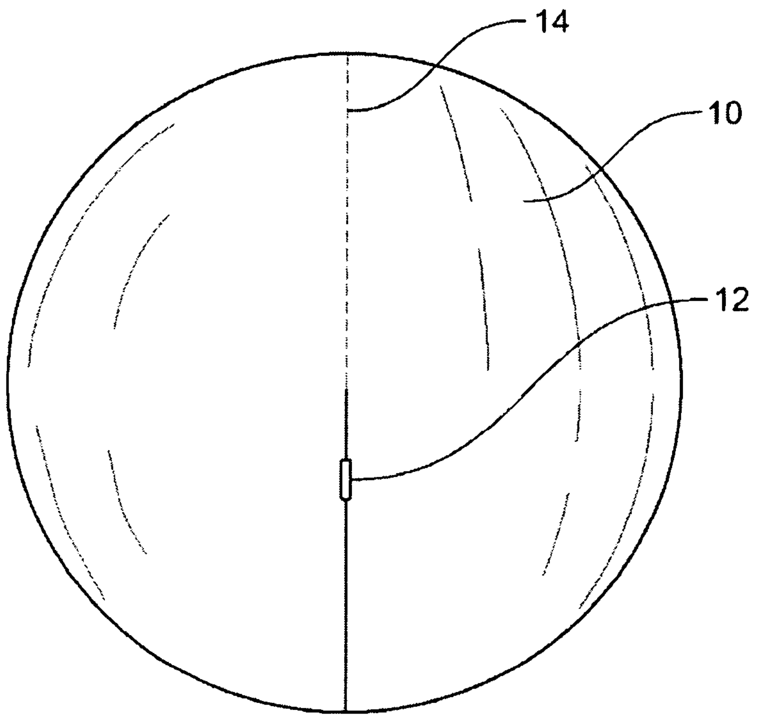
FIG. 1 is a perspective view of a sphere with a filament inserted within the sphere.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description of the Invention", relates to a requirement of the United States Patent Office, and does not imply, nor should be inferred to limit the subject matter disclosed herein.

A method of accurately aligning a sphere or ball to a specific orientation, as might be required when applying a decoration, or performing other manufacturing processes includes the steps of detecting an internal alignment feature and orienting the sphere according to calculations derived from the alignment feature. Rather than relying on visible minor features on the surface of the ball or sphere, the present method relies on internal features that are either already present as a result of the manufacturing process, or that are intentionally inserted into the ball or sphere during or after the manufacturing process. These internal features are of a type that can be detected with an X-ray imaging device, or other imaging device that is capable of identifying materials of different properties within an opaque sphere.

The orientation method uses the image of the internal alignment feature to calculate the current orientation of the sphere, calculate how the orientation must be changed to place the sphere in the desired orientation, and communicate that required change to a motion control device that then picks up the sphere and places it in the desired orientation. At this step the sphere can be placed in a stationary fixture for future processing, or directly into a fixture for a manufacturing process—e.g., decoration of the sphere with logos and/or graphics.

FIG. 1 is an illustration of a ball 10 having an internal identifying feature 12 present. The internal identifying feature, in the present invention, can be detected using x-ray imaging devices, ultrasonic imaging equipment, positron emission technologies, thermal, electronic, magnetic, ultrasonic, or other imaging technology or imaging device, hereafter "imaging device", that may be used for part inspection during, or following manufacturing, and which is capable of identifying internal features of a sphere that are otherwise not visible.

In a first embodiment, the method may use an inherent feature, such as internal features that are created during the normal course of sphere manufacture—such as a parting line, or a non-uniformity that is repeatably present on an inner layer of a sphere which consists of at least two separate materials. A first embodiment uses an imaging device to image the non-visible core of the sphere and determine the orientation of the sphere.

In another embodiment of the present method, the alignment feature is inserted intentionally inside the sphere during the manufacturing process. For example, a sphere that is compression or injection molded may have one or more features installed inside the mold during manufacturing, which remain aligned to the parting line of the mold during that process. Those features can then be viewed with an imaging device to determine the sphere's orientation during subsequent processes.

Another option is to insert alignment features inside the sphere during a prior manufacturing process, during which the alignment of the sphere is more easily achieved. For example, a sphere that goes through a process to remove any 'flash' at the seam 14 from the surface is typically aligned using common mechanical methods. Using the flash as the orienting feature, one or more aligning features can be embedded into the sphere, at the area of flash or in a different area, before the sphere is released from that process. Alignment features may be composed of any material that is easily detected by an imaging device in downstream processes to enable re-orientation of the sphere.

Figure 2:
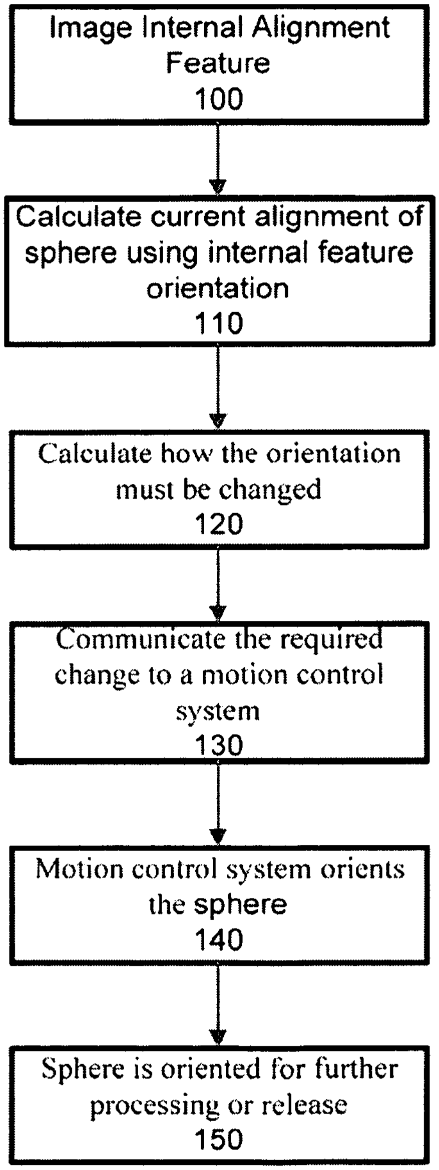
FIG. 2 is a flow chart of an embodiment of the present invention.

Turning now to FIG. 2, a flowchart of the current method is shown. An internal alignment feature is present in the sphere, block 100. The sphere is scanned or imaged and the current alignment of the sphere is calculated using the internal feature orientation, block 110. Next, it is determined how the orientation must be changed from the current orientation to a desired orientation, block 120. The required change is communicated to a motion controller or motion control system, block 130. The motion control system orients the sphere into the desired position, block 140. Finally, the sphere is oriented in the desired position for further processing or release, block 150.

Internal imaging is used to identify the internal alignment feature and to orient the sphere or ball. The internal feature may be inserted into the sphere during the initial manufacturing or at an interim manufacturing step. Advantageously, there is no need to move or spin the sphere to locate the features used for alignment of the sphere or ball. Rather, the alignment feature(s) are immediately identifiable from a static position, regardless of the orientation, allowing for a through-put rate faster than that of current technology for such processing as sphere decorating.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method for aligning a sphere to a desired orientation, the method comprising:

imaging a non-surface alignment feature of the sphere, in a static state, using an imaging device;

calculating a current orientation of the sphere based on an image of the non-surface alignment feature generated by the imaging device;

calculating a relationship between the current orientation of the sphere and the desired orientation of the sphere;

communicating the relationship to a motion control device; and activating the motion control device, subsequent to imaging the non-surface alignment feature, to align the sphere into the desired orientation.

2. The method of claim 1, wherein the non-surface alignment feature is inherent to the sphere.

3. The method of claim 1, wherein the non-surface alignment feature is intentionally inserted into a non-external position of the sphere.

4. The method of claim 1, wherein the non-surface alignment feature is imaged using an imaging device.

5. The method of claim 1, wherein the non-surface alignment feature is detected using an imaging device capable of identifying materials of differing properties through an opaque sphere.

* * * * *